April 30, 1968  R. E. GARRETT  3,380,237

LETTUCE HARVESTER

Filed Jan. 3, 1964

INVENTOR.
ROGER E. GARRETT
BY
Lothrop & West
ATTORNEYS

INVENTOR.
ROGER E. GARRETT
BY
Lothrop & West
ATTORNEYS

April 30, 1968  R. E. GARRETT  3,380,237
LETTUCE HARVESTER

Filed Jan. 3, 1964  7 Sheets-Sheet 4

INVENTOR.
ROGER E. GARRETT
BY
Lothrop & West
ATTORNEYS

April 30, 1968  R. E. GARRETT  3,380,237
LETTUCE HARVESTER
Filed Jan. 3, 1964  7 Sheets-Sheet 5

INVENTOR.
ROGER E. GARRETT
BY
Lothrop & West
ATTORNEYS

April 30, 1968  R. E. GARRETT  3,380,237
LETTUCE HARVESTER
Filed Jan. 3, 1964  7 Sheets-Sheet 6
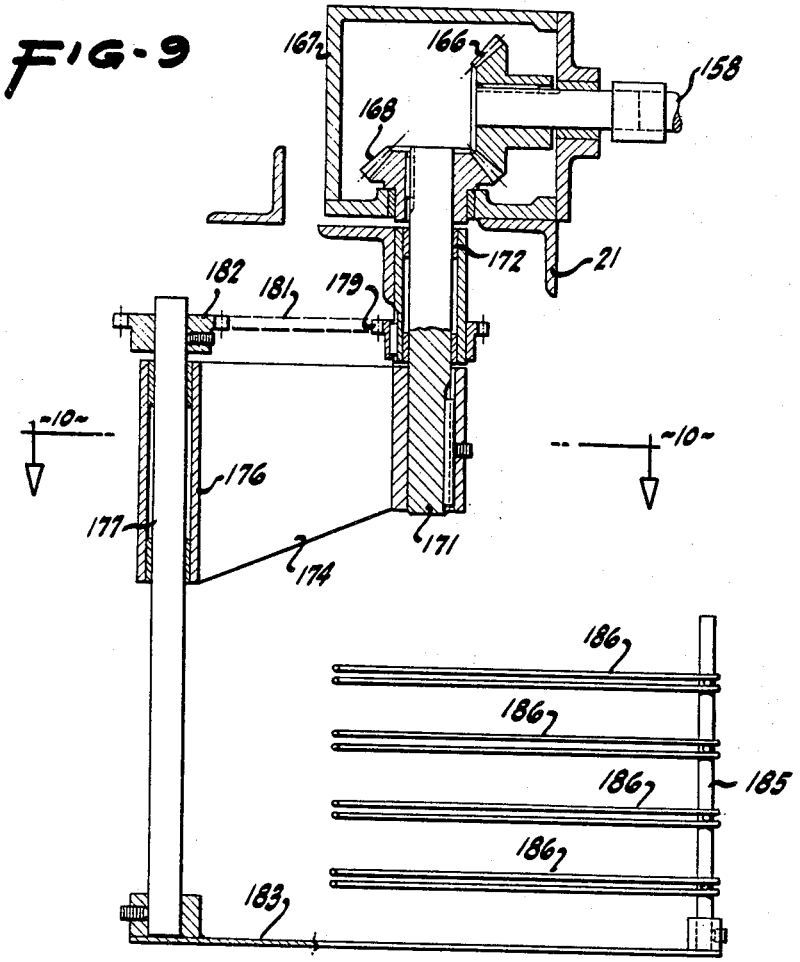
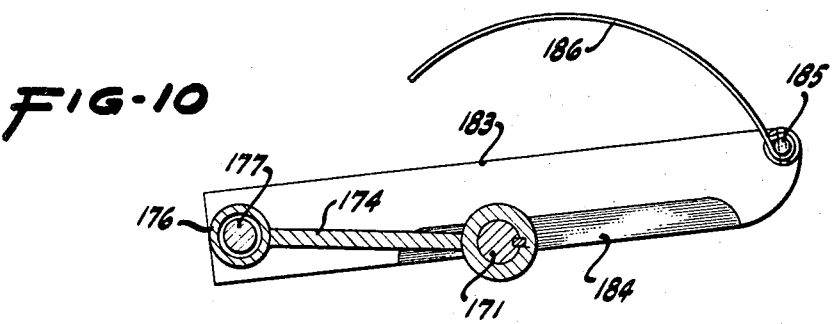
INVENTOR.
ROGER E. GARRETT
BY
Lothrop & West
ATTORNEYS April 30, 1968 R. E. GARRETT 3,380,237
LETTUCE HARVESTER Filed Jan. 3, 1964 7 Sheets-Sheet 7

INVENTOR.
ROGER E. GARRETT
BY
*Lothrop & West*
ATTORNEYS

United States Patent Office 3,380,237
Patented Apr. 30, 1968

3,380,237
LETTUCE HARVESTER
Roger E. Garrett, Davis, Calif., assignor to The Regents of the University of California, Berkeley, Calif.
Filed Jan. 3, 1964, Ser. No. 335,550
30 Claims. (Cl. 56—327)

My invention relates to machines for operation in the growing fields wherein lettuce is available for harvesting and has to do with a device for selecting appropriate lettuce heads and for severing them from their growing stem and taking them from the field for further handling.

While some parts of the growing and handling of lettuce have been mechanized, hand work is still involved in selecting and removing appropriate heads. The selection is usually based on two principal factors, one of which is the size of the head, gauged usually by its height from the ground, and the other is the firmness of the head, gauged by the amount of depression or deflection produced when the head is squeezed. Selection has been made by pickers based largely on experience. The firmness of a lettuce head varies from time to time as the head matures, the mature and older heads available for harvesting being quite firm and the younger ones being readily deflected by an imposed force. The firmness varies also with the moisture content of the lettuce head and this may vary during the day. In the morning, there is usually substantial moisture available and the head is relatively firm, whereas later in a sunny afternoon after the moisture has been largely dissipated, the head becomes somewhat soft. In addition, the lettuce head is not always accurately conformable to a predetermined geometrical pattern. Sometimes the head is fairly well exposed and other times is partially covered by extra leaves which eventually are trimmed off for market purposes. These may mask the true size of the head and may affect its apparent firmness.

In the customary lettuce field the land is very nearly flat and level for irrigation. The lettuce is usually planted in parallel rows. There is a flat topped earthen mound carrying two closely spaced rows of lettuce plants, then an intervening lower path to afford room for irrigation, the wheels of cultivating equipment, access and the like, and then an adjacent raised mound with parallel, double rows of lettuce plants.

It is an object of my invention to provide a lettuce harvester which can be utilized in a lettuce field having the usual planting arrangement and which will upon propulsion along or over a lettuce row be effective to select lettuce heads appropriate for harvesting and to sever such heads from their growing stalk and remove them from the ground for further handling.

Another object of the invention is to provide a lettuce harvester in which the criteria for selecting the lettuce heads to be harvested can be varied from time to time.

Another object of the invention is to provide a lettuce harvester which can select and remove from the normally closely packed rows any selected head to be harvested without disturbing other lettuce heads.

Another object of the invention is to provide a lettuce harvester in which the size of the lettuce heads can readily be gauged.

A still further object of the invention is to provide a lettuce harvester in which the firmness of the lettuce heads can readily and automatically be gauged.

A still further object of the invention is to provide a lettuce harvester in which the servering means may be remote from the selecting means and in which the signals of the selecting mechanism are retained for a predetermind interval in order that the harvesting or severing instrumentality may be appropriately operated.

A still further object of the invention is to provide a lettuce harvester which will select appropriate heads for harvesting without damage either to the harvested heads or to the heads which are left growing.

Another object of the invention is to provide a lettuce harvester which can readily be fabricated and which is capable of long life and trouble-free operation in the harvesting field.

Another object of the invention is in general to improve lettuce harvesting machines.

Other objects together with the foregoing are attained in the embodiment of the invention described in the accompanying description and illustrated in the accompanying drawings, in which:

FIGURE 9 is a cross section, the plane of which is indicated by the line 9—9 of FIGURE 2;

FIGURE 10 is a cross section, the plane of which is indicated by the line 10—10 of FIGURE 9;

Figure 1:
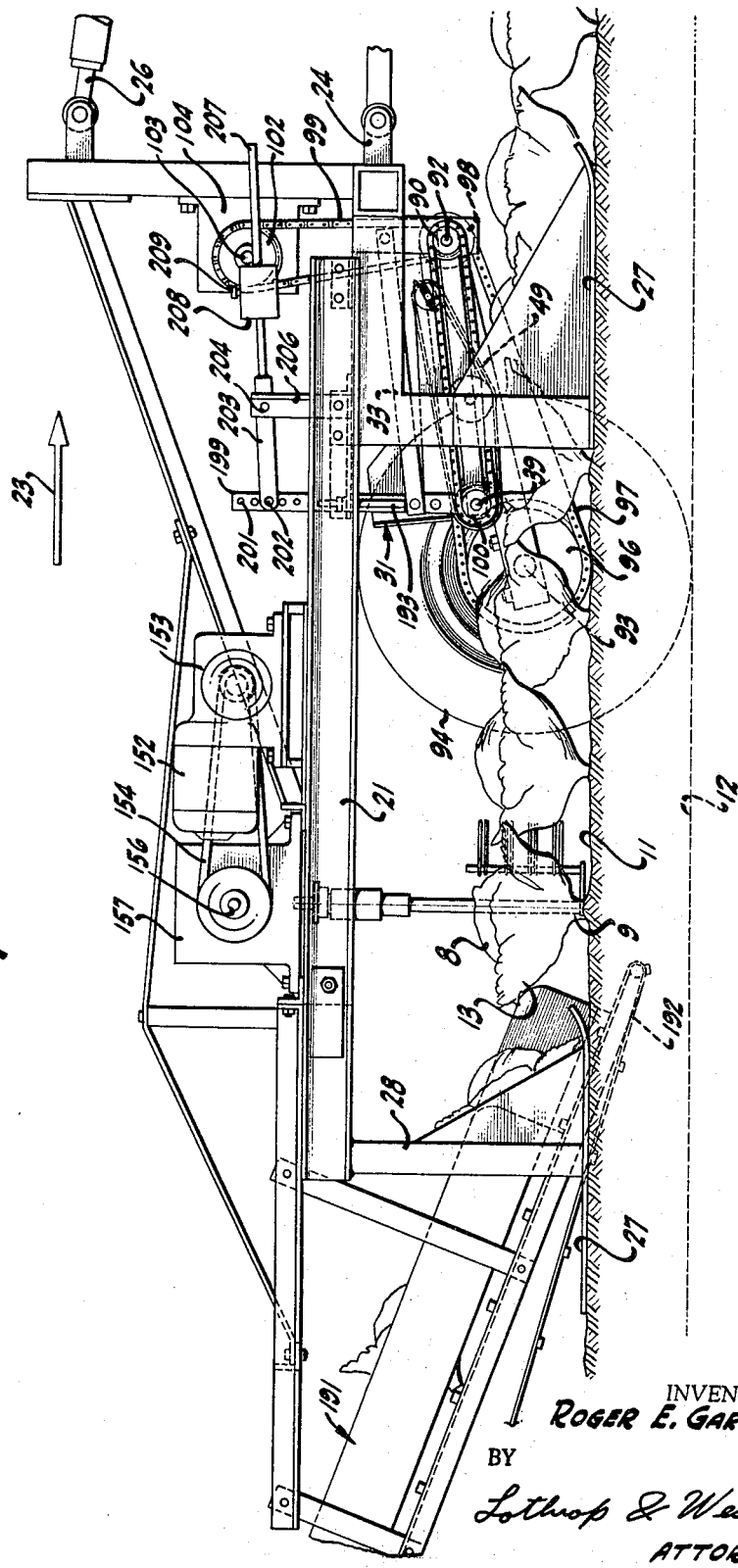
FIGURE 1 is a side elevation of a lettuce harvester constructed pursuant to the invention as it is disposed for operation in a lettuce field.

While the lettuce harvester of the invention can be utilized in connection with other produce than lettuce, it has been incorporated with particular success in connection with the harvesting of that vegetable. As an example, therefore, it is so described herein. The customary planting of lettuce is with the plants in twin rows 6 and 7 of lettuce heads 8. While the locations of the heads are diagrammatically illustrated in FIGURE 2, the heads are shown in an average aspect in FIGURE 1. Each head includes a stem or stalk 9 growing in and sometimes above the surface of a continuous mound 11, the mound carrying two closely spaced plant rows and being spaced from a similar, parallel mound by an intervening, lower and relatively flat surface 12. Each of the heads 8 includes an approximately or generally spherical, compact central portion of considerable firmness and a number of outer or wrapper leaves 13 which generally do not entirely cover the upper portion of the head, but in some instances overlie and cover the firm head 8. Often the wrapper leaves 13 droop onto and cover some of the earth in the mound 11 but are substantially clear of the ground surface 12. The various lettuce heads, although shown substantially of the same size in FIGURE 1, vary a good deal during the growing season from relatively small to marketable size and also vary in firmness with no necessary dependence upon size.

The harvester includes a main frame 21 made up of metal shapes and structural members and is designed to be drawn in the direction of the arrow 23 in FIGURE 1 behind a tractor (not shown). A tractor connection is made by a hitch mechanism 24 and an adjusting mechanism 26 so that the entire framework 21 can be lifted away from the ground and supported entirely on the tractor or can be lowered into a position as shown in FIGURE 1 for advancement over the ground. When the main frame 21 is fully lowered, it preferably rests entirely on ground-engaging shoes 27. The shoes are sled-like and are at the bottom of frame supports 28, so that the frame is normally supported in a level condition and at a predetermined distance over the carefully made top of the mounds 11. Since the mounds are virtually undisturbed during the growing season, they serve as an accurate datum plane while the ground surface 12 may be substantially altered by irrigation and other factors.

Disposed on a cross member 29 included in the main frame 21 is mechanism for sensing the lettuce heads available and appropriate for harvesting both according to size and according to firmness. Four similar sensing mechanisms can be provided in parallel to take care of two double rows at once, but for clarity herein but one sensing mechanism is shown. A detector frame 31 is supported on the cross member 29 in a trailing position. Suitably connected to brackets 32 on the main frame are pairs of parallel links 33 and 34 at either side of the frame. The links at one end are mounted on a pair of pivot tubes 36 and 37, the tube 36 bearing on a shaft 35. At the other end the pairs of links 33 and 34 are connected to pivot shafts 38 and 39 for the purpose of supporting a pair of side plates 41 and 42. To afford an adjustment, the links 33 and 34 are pivoted to uprights 43 and the plates 41 and 42 are pivoted on the shaft 39. Eccentric adjusters 44 are rotatable in the uprights and engage the plates 41 and 42 so that the plates and attached parts are tiltable into any desired position. The side plates and uprights are tiltable and are movable in a generally up and down direction or for lifting and lowering movement with respect to the main frame 21. The side plates 41 and 42 remain substantially parallel to themselves in any raised or lowered position. The range of movement of the detector frame is sufficient to carry it low enough to encounter the lowest lettuce head which might be harvested and also high enough to rise above the largest head which might be encountered.

Included in the detector frame are rollers 46 and 47. The roller 46 is mounted on the cross shaft 39 to revolve about a transverse, horizontal axis. The other roller 47 is rotatably mounted on a cross shaft 48 extending between the plates 41 and 42 and rotates about a parallel, transverse horizontal axis. Trained around the rollers 46 and 47 is a belt 49 conveniently made of rubberized fabric. The tension of the belt is maintained by an idler roller 51 also mounted in the side plates 41 and 42 and settable in slots 52 therein between a retracted position in which the belt is relatively loose and an extended position in which the belt is relatively tight.

As the mechanism advances over a row of lettuce heads, the detector frame and particularly the belt 49 rides along and in contact with the upper portions of the successive lettuce heads. The belt is driven and its lower run does not move appreciably in contact with the lettuce heads. Abrasion is avoided. To ease the initial encounter and also to avoid damage to the lettuce, the idler 51 is higher than the roller 47 so that the leading portion of the belt has an inclined surface. This readily and gently encounters an upstanding lettuce head 8 (FIGURE 3) and in effect cams or lifts the detector frame on its parallel link support so that the rollers 47 and 46 travel in succession over the upper portion of the rounded lettuce head. In order that the belt will not be unduly deflected as it encounters a lettuce head, there is provided a backing plate 53 and a support 54 joined to the side plates 41 and 42 to serve as a belt reinforcement so that the deflector frame is appropriately lifted. As the main frame advances in the direction of the arrow 23, the detector frame rides up onto and bears on a lettuce head 8.

Figure 4:
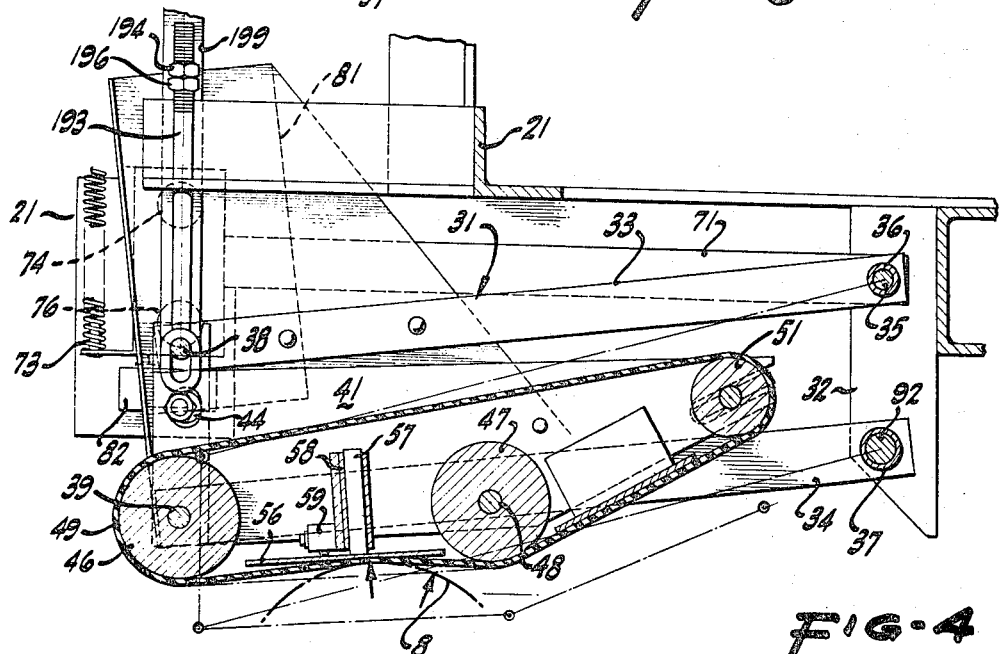
FIGURE 4 is a cross section, the plane of which is indicated by the line 4—4 of FIGURE 2.

As particularly shown in FIGURE 4, when the detector frame has gotten well onto a lettuce head 8 and when the head is between the rollers 46 and 47, the entire net weight of the detector frame rests upon the lettuce. This is sufficient to compact any wrapper leaves and place the belt in close proximity to the head proper. This weight, the roller spacing and the lettuce head shape cause a deflection upwardly of the bottom run of the belt 49. The belt deflection is utilized as an indication or measure of the location of the upper portion or topmost point of the lettuce head. It will be understood that while geometrical terms are utilized herein for convenience and while the shape of various lettuce heads approaches regular geometrical configuration with more or less accuracy, there may actually be a small area rather than a literal point at the uppermost part of the head, yet the operation of the structure is substantially the same. The deflection of the belt 49 causes upward deflection of an interior follower 56. This is a backing plate of considerable horizontal extent and is movable vertically as guided by a supporting rod 57 slidable in a guide bearing 58 mounted on the side plates 41 and 42. As the follower 56 moves upwardly with the deflection of the belt, it encounters and actuates an electric switch 59. The switch response is a signal indicating the subjacent location of the upper portion of the lettuce head 8.

Pursuant to the invention, the signal characterized by actuation of the switch 59 is utilized as a measure of the height of the top of the lettuce head. Since the height of the head is sufficient to actuate the switch 59, the first criterion as to size has been measured. The signal also indicates the position or location of advance of the entire frame with respect to the location of the lettuce head. The signal actuates an impulse structure for then determining whether or not the lettuce head is sufficiently firm for harvesting. The second criterion as to firmness is measured only following a satisfactory measure of the height condition.

Figure 14:
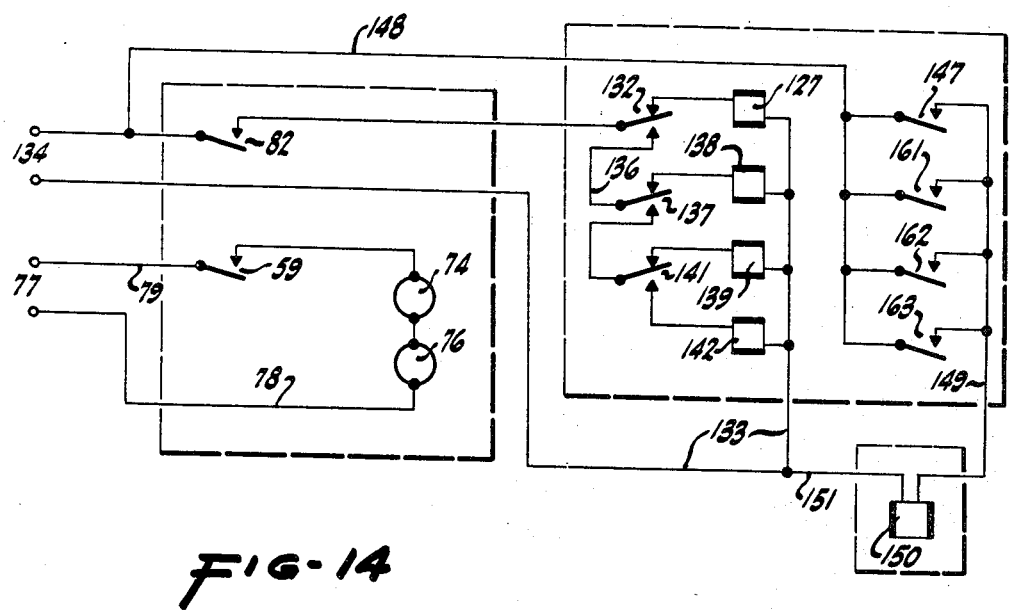
FIGURE 14 is a wiring diagram of the electrical circuitry.

Arranged on the main frame alongside the detector frame is an impulse frame. This includes an arm 71 pivoted at one end about an extension of the shaft 35. An adjusting screw 72 on a main frame bracket can be regulated more or less to load the arm 71 with regard to the main frame 21. A helical coil spring 73 engaged by the screw 72 and seated on the arm 71 tends to lower the impulse frame relative to the frame 21. Mounted on the impulse frame is a pair of electromagnets 74 and 76 connected to a suitable source 77 of electricity by conductors 78 and 79 (FIGURE 14). The switch 59 is in series with the electromagnets 74 and 76. Closure of the switch 59 energizes the electromagnets 74 and 76 to lock the detector frame and the impulse frame together.

Upstanding from the detector frame is a substantially vertical planer plate 81 of magnetically responsive material disposed to move in a plane very close to the cores of the electromagnetic coils 74 and 76. The switch 59 is actuated when the belt 49 is deflected upwardly by the upper portion of the lettuce head. In closing, the switch 59 energizes the magnets 74 and 76 and so locks the detector frame directly to the impulse frame no matter in what relative location those frames might happen to be when the switch 59 is closed.

Further movement in an upward direction of the detector frame together with movement of the impulse frame after the frames have been locked together is utilized as a measure of the firmness of the lettuce head 8. Since the belt 49 is deflected upwardly and the plates 41 and 42 are tilted so that the roller 46 is relatively low, the belt contacts not only the topmost part of the lettuce head, but also contacts another portion on the trailing side of the lettuce head at a lower elevation than the top thereof. The adjusters 44 situate the roller 46 at the selected elevation lower than the roller 47. In travelling forwardly, therefore, the belt portion adjacent the roller 46 and the roller 46 itself must necessarily be lifted or cammed upwardly or raised if the lettuce head is sufficiently firm to support the net weight (as adjusted by the screw 72) of the combined detector frame and impulse frame. If the lettuce is firm, the camming action will occur and the two frames will be lifted upwardly in unison. If, however, the lettuce is soft or not solid, then the advancing roller 46 will not rise and will not lift the joined detector and impulse frames. Should the lettuce be soft, the mechanism simply rides over it and the undamaged head is left in the field without further attention and for further growth.

Figure 5:
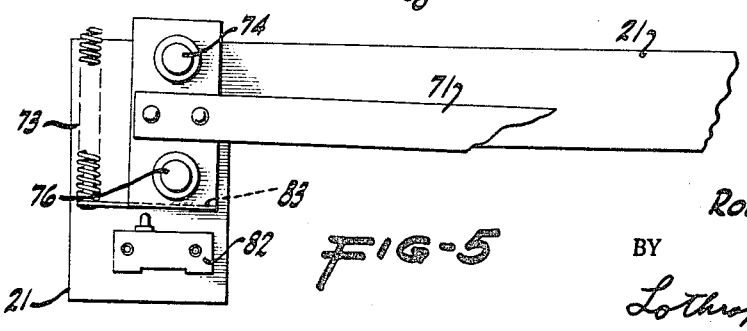
FIGURE 5 is a fragmentary detail showing part of a switch mechanism.

In the event the head is firm enough to be picked, then the roller 46 in passing up to the top of the lettuce head lift both of the frames and this motion actuates a signal. As particularly shown in FIGURES 3, 4 and 5, there is mounted on the main frame near the free end of the arm 71 an electrical switch 82 normally held in open position by a ledge 83 on the lower portion of the arm 71. The switch 82 is thus normally open even though the switch 59 is closed. Upon lifting of the impulse frame due to the mechanism camming or riding over the firm lettuce head, the arm 71 lifts and removes the flange 83 from the switch 82, which, being free, moves to its closed position. This is a signal that the lettuce head just encountered is firm enough for harvesting. The two main criteria of size and firmness have thus been established.

The impulse from the switch 82 can be used directly to operate a severing means for detaching the lettuce head from its stem, but in the customary and present construction of the apparatus, the severing structure is a substantial distance behind the detecting apparatus. Means are provided for storing an impulse from the signal switch 82 until such time as the mechanism has advanced the severing structure far enough to harvest the previously sensed lettuce head.

Figure 7:
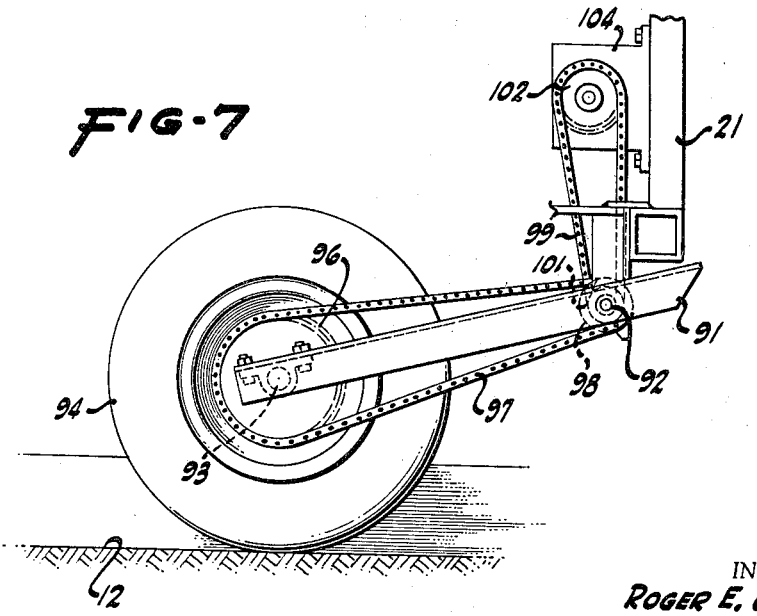
FIGURE 7 is a side elevation of a part of the tracking wheel mechanism, the plane of the view being indicated by the line 7—7 in FIGURE 2.

Since the operation of the impulse storing mechanism and the advance of the belt 49 are related to the forward travel of the machine, there is preferably provided, particularly as shown in FIGURE 7, a wheel frame 91 connected to a driven and pivot shaft 92 to the main frame 21. At its trailing end, the frame 91 carries an axle 93 supporting a ground-engaging wheel 94. A sprocket 96 rotatable with the wheel 94 is connected by a chain 97 to a sprocket 98 fixed on the driven shaft 92. At its outer end, the driven shaft 92 has a sprocket 90 (FIGURE 3) connected by a chain 95 to a sprocket 100 fixed on the roller shaft 39 so that the belt 49 operates at a speed to avoid abrading the lettuce.

Figure 12:
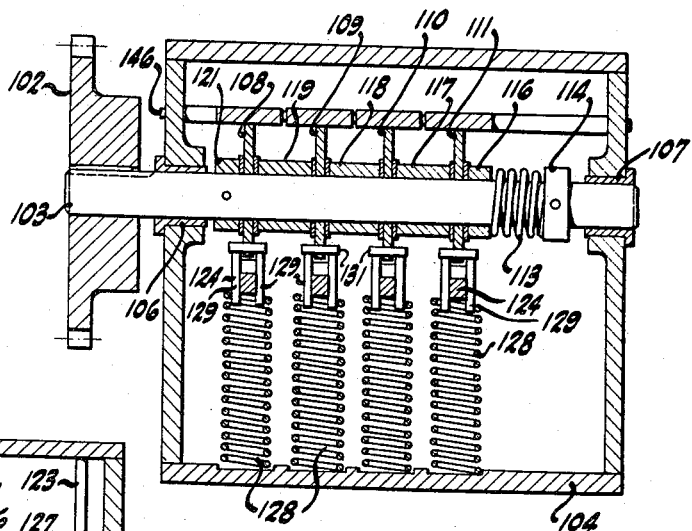
FIGURE 12 is a cross-section, the plane of which is indicated by the lines 12—12 of FIGURE 11.
Figure 13:
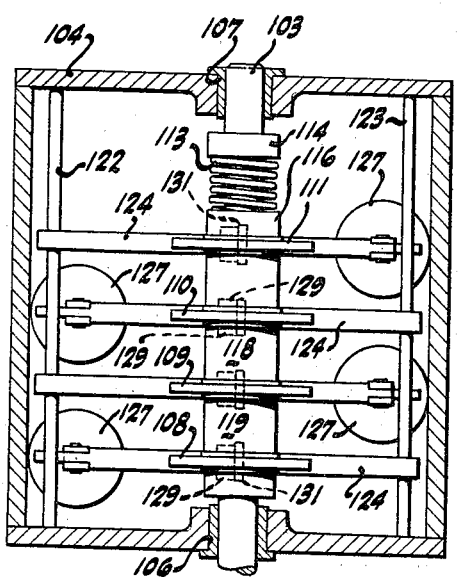
FIGURE 13 is a cross section, the plane of which is indicated by the lines 13—13 of FIGURE 11.

To transmit drive to the impulse storing structure, a driven chain 99 extends from a drive sprocket 101 on the shaft 92 to a sprocket 102 on a main shaft 103 of the impulse storage mechanism (FIGURE 12). The shaft 103 is disposed in a housing 104 and revolves in appropriate bearings 106 and 107 so that the shaft 103 turns in exact accordance with the forward advance of the machine.

Disposed on the shaft 103 but not fixed thereon are timing cams 108, 109, 110 and 111. Any number of such cams can be provided, but it has been found in practice that three or four are adequate. The cams are frictionally driven and for that reason are urged endwise by a spring 113 bearing against a collar 114 fixed on the shaft 103 and also bearing against a ring 116 adjacent the cam 111. Similar rings 117, 118 and 119 are disposed on the other side of the cams, the latter bearing against a collar 121 pinned on the shaft 103. The spring 113 exerts enough force so that all of the cams tend to rotate in unison with the shaft 103, unless they are otherwise restrained.

Extending lengthwise of the housing 104 are rods 122 and 123. Alternately mounted on the rods 122 and 123 are levers 124 arranged for pivotal movement at one end and attached at the other end to the movable element 126 of one solenoid 127 of several. Each lever 124 is normally urged upwardly by a spring 128 resting on the bottom of the casing 104 and surrounding a pair of pins 129 fast on the lever 124 near the center thereof. The pins 129 are in the path of projections 131 extending laterally from the adjacent one of the cams such as 108. When the parts are in the position shown in FIGURE 11, even though the shaft 103 is rotating and tends to turn the cam 108, for example, clockwise in FIGURE 11, the cam cannot advance as long as the projections 131 are restrained by the pins 129.

As seen particularly in FIGURE 14, when the switch 82 is closed, a circuit is completed through a two-pole switch 132 to the solenoid 127, the return from which is through a common conductor 133 and to a source 134 of electrical energy. When the solenoid 127 is energized, it pulls down the lever 124 against the urgency of the spring 128 and removes the pins 129 from the path of the projections 131. At that instant the cam 108 begins rotation in unison with the shaft 103 and thus advances in synchronism with the advance of the main frame 21 over the lettuce row.

Figure 11:
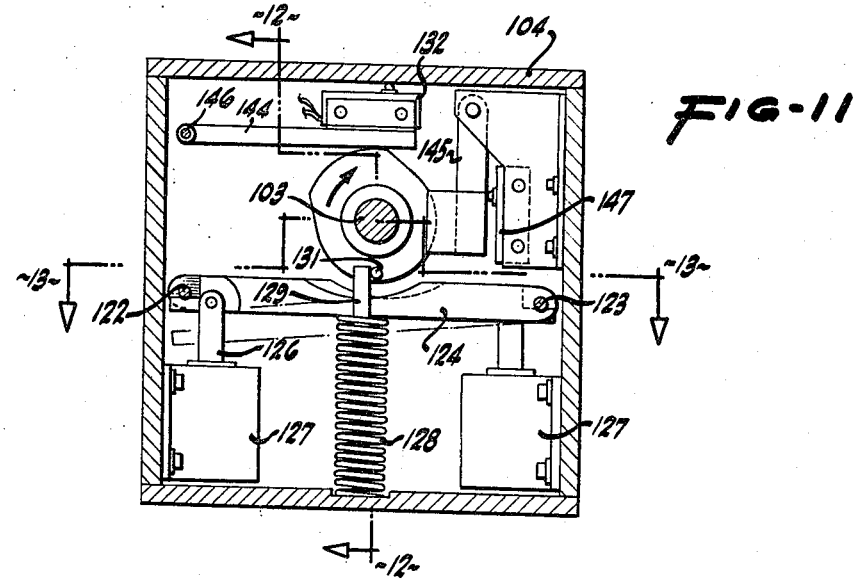
FIGURE 11 is an elevation, with an end cover removed, of part of the impulse storage mechanism.

Once the solenoid 127 has been energized and the pins 131 released, the cam 108 revolves steadily. Sometimes a number of additional closures of the switch 82 occur due to irregularities in the lettuce head or minor motions of the machine but these are inconsequential since the first switch operation has already released the cam 108. As the cam 108, for example, rotates from its initial starting position as shown in FIGURE 11, it turns for a predetermined period in immediate contact with a superposed lever 144 mounted within the casing 104 on a cross shaft 146. When the high portion of the cam is against the lever 144, a two position switch 132 on the lever 144 is maintained against the top of the casing 104 and is thus retained in one condition. After the cam 108 has rotated through approximately a quarter turn, the low portion of the cam underlies the lever 144, which then lowers by gravity. The lowering switch 132 changes condition and cuts the solenoid 127 out of the circuit. Simultaneously, through a conductor 136 and a similar two-pole switch 137, the next successive solenoid 138 is brought into circuit for the adjacent one of the levers 124. Thus, after a predetermined motion of the first cam 108, the first solenoid is inactivated and a circuit to the successive solenoid is established.

When the second, proper impulse comes in due to actuation of the switch 82 by the second lettuce head, the next cam 109 is released by the solenoid 138 to begin its rotation. This operation, after a predetermined cam rotation, introduces the next successive solenoid 139 into the circuit. Upon operation of the corresponding cam, a double position switch 141 is shifted so that finally a solenoid 142 for the fourth cam 111 may be activated. In this fashion, as many as four separate impulses can be stored in the accumulating device. As much delay as is represented by advancement of the carriage to bring the severing means into operating position can elapse between each closure of the switch 82 and the resulting actual operation of the severing mechanism.

As the cam 108, for instance, continues to turn (through about two hundred seventy degrees), the pins 131 encounter a depending lever 145 pivoted in the casing 104 and swing the lever to actuate a switch 147. This closes and establishes a circuit through a conductor 148 joined to the source 134 and through a return conductor 149 extending to a clutch solenoid 150. The other side of the solenoid is joined by a lead 151 to the conductor 133, thus completing the circuit.

Figure 2:
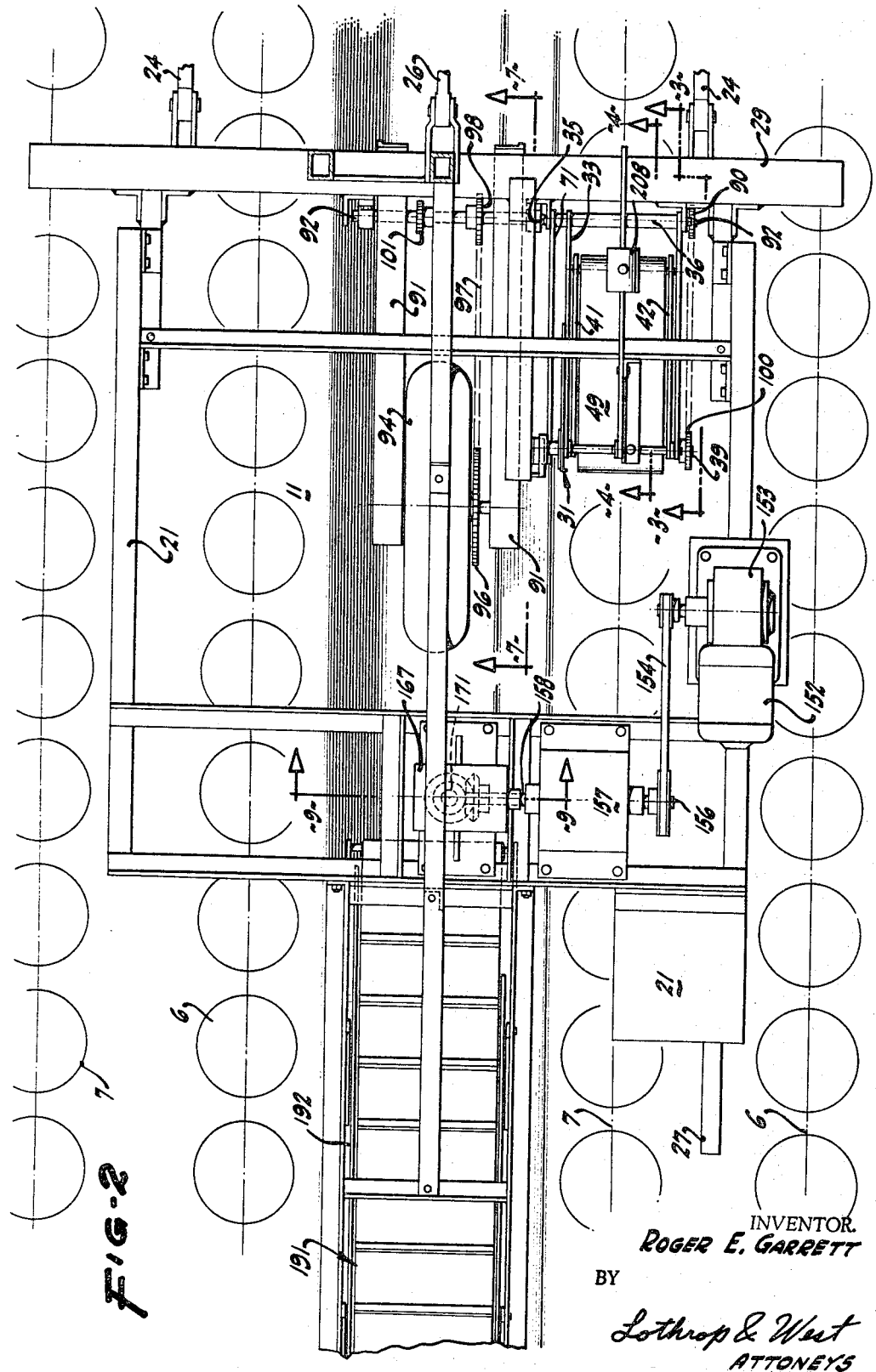
FIGURE 2 is a plan of the lettuce harvester shown in FIGURE 1, the impulse storing mechanism being removed.

As particularly disclosed in FIGURE 2, the severing mechanism controlled in response to the closure of the switch 147 is driven by a continuously operating electric motor 152 connected through a reduction gearing 153 and a belt drive 154 to the input shaft 156 of a single cycle clutch 157. The output shaft 158 of the single cycle clutch is rotated for one rotation only whenever the switch 147 (or similar switches) is momentarily closed. The duration of closure of the switch 147 does not affect the operation of the single cycle clutch which, once put into operation, completes but a single revolution. The remaining levers 145 for the other cams 109, 110 and 111 within the storage mechanism 104 are comparably connected to similar switches 161, 162 and 163. These, being in parallel, all produce similar results when they are actuated in accordance with the particular cam to which they respond. Each cam, once put into operation, continues for a single cycle around the shaft 103 until such time as its projections 131 come against the restraining pins 129, by that time restored to their initial location after the corresponding solenoid such as 127 has been de-energized. The two-pole switches 132, 137 and 141 are also restored by the return of the various levers 144 when the cams are again blocked.

Upon energization of the single cycle clutch 157, the output shaft 158, as shown in FIGURES 2 and 9, causes a single rotation of a bevel gear 166 disposed in a housing 167 on the main frame. A meshing, comparable bevel gear 168 is arranged to rotate with a vertical shaft 171 carried in a fixed journal 172. At its lower end, the shaft 171 is provided with a crank arm 174 having a journal 176 within which a vertical shaft 177 is rotatable. In order to produce a planetary motion, the shaft 171 rotates the arm 174 to move the journal 176 in a circle. The journal 172 provides a stationary mounting for a sun pinion 179 connected by a chain 181 to a planet pinion 182 of the same diameter and fast on the upper end of the depending shaft 177.

Figure 8:
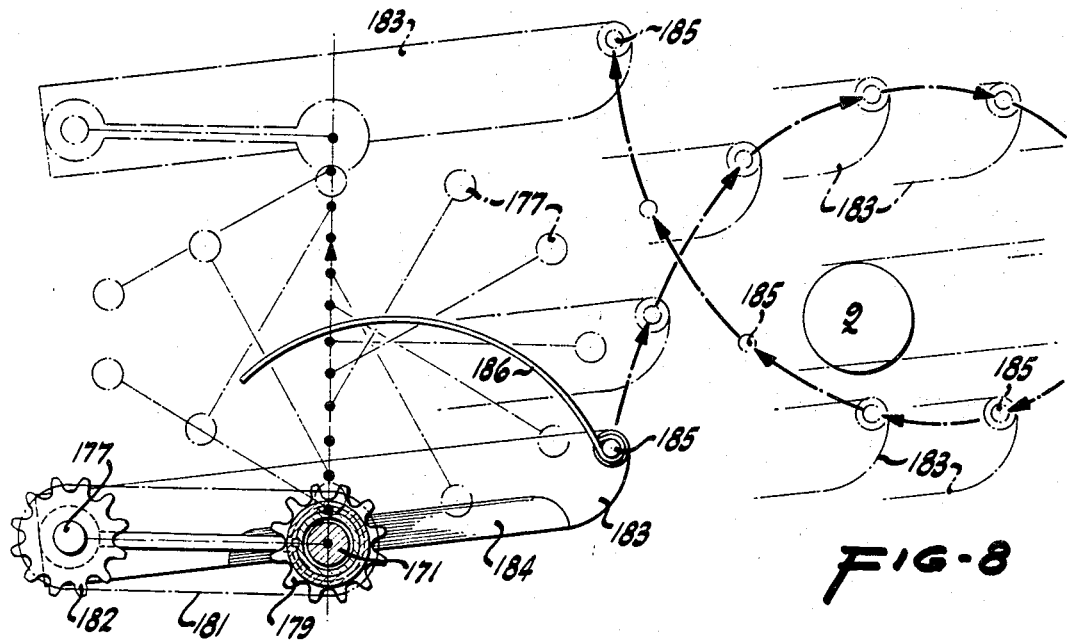
FIGURE 8 is a plan of part of the severing mechanism and attendant structure, the knife and driving arrangement being illustrated in a number of successive positions.

At the lower end of the shaft 177 a knife or severing means 183 is firmly fixed. The knife is an elongated, flat blade having a sharpened contour 184 to form a cutting edge. When the driven shaft 158 rotates for one rotation, the shaft 177 follows in an orbital or planetary path about the axis of the shaft 171 so that the knife 183, particularly as shown in plan in FIGURE 8, follows a path in which the knife is always parallel to itself. Any point on the knife travels through an overlapped loop curve. The knife takes part in a substantially transverse excursion from its position of rest and then retreats with a transverse component to its position of rest, the longitudinal component of the knife return motion being opposite to the forward motion of the main frame.

When the knife mechanism or severing mechanism is actuated, the knife extends from its retracted position alongside of the lettuce head and intervenes between the lettuce head to be severed and the next successive lettuce head, then withdraws across the stalk or stem of the selected lettuce head, severing it, and finally returns to its initial withdrawn position to one side of the lettuce row. The knife is effective to sever but a single, selected lettuce head without disturbing lettuce heads either before or behind or to one side of the one selected. Upon some occasions, the knife operates above ground, but on other occasions it operates slightly below ground beneath the surface of the mound 11. In all cases, the knife is quickly effective to sever the appropriate lettuce head.

Since the lettuce head might otherwise remain in its severed location, I prefer to mount on the outboard end of the knife blade 183 an upright rod 185 carrying a plurality of spring wire fingers 186 arcuate in plan and mounted for limited rotation on their supporting rod 185. As the knife effectuates its severing operation, the fingers 186 move in between adjacent lettuce heads, the limited rotation on the rod 185 facilitating the finger penetration between heads and avoiding damage. When the knife completes its travel, the severed lettuce head is engaged by the fingers. At this point, the fingers are prevented from rotating further on the rod 185. The fingers pull the severed head out of the row. The head can be deposited on the ground surface 12 between adjacent mounds in the absence of conveying mechanism.

The proportioning of the parts, that is to say, their relative distances and the duration of the storage interval or distance within the storage mechanism 104, dependent upon the rate of rotation of the wheel 94, are such that an impulse put into the mechanism when the sensing devices are in contact with the selected lettuce head is effective to actuate the knife when the main frame has been advanced and the knife is immediately opposite that particular lettuce head. In this fashion, successive signals from successive lettuce heads are stored in the storage mechanism 104 up to a total of four impulses and are released from that mechanism to actuate the knife at times when the knife has gotten immediately opposite each of the selected lettuce heads.

A lettuce head which has been severed is preferably not deposited in the trough 12, but is thrown by the fingers 186 directly onto a discharge conveyor 191 operating from a low forward point to a high rearward point on a conveyor frame 192 depending from the main frame 21. The operation of the conveyor is to receive the severed lettuce head and to carry it upwardly and rearwardly of the device to a point for further operation.

It is preferred to provide on the mechanism various additional settable means so that the particular size, that is to say, height, of the lettuce heads selected and the particular compaction of the wrapper leaves can be varied in accordance with the desires of the operator and also in accordance with the particular harvesting conditions. It will be remembered that the firmness or interference of the wrapper leaves may vary during the day and it may be that different sized lettuce heads are to be picked at different times.

Figure 3:
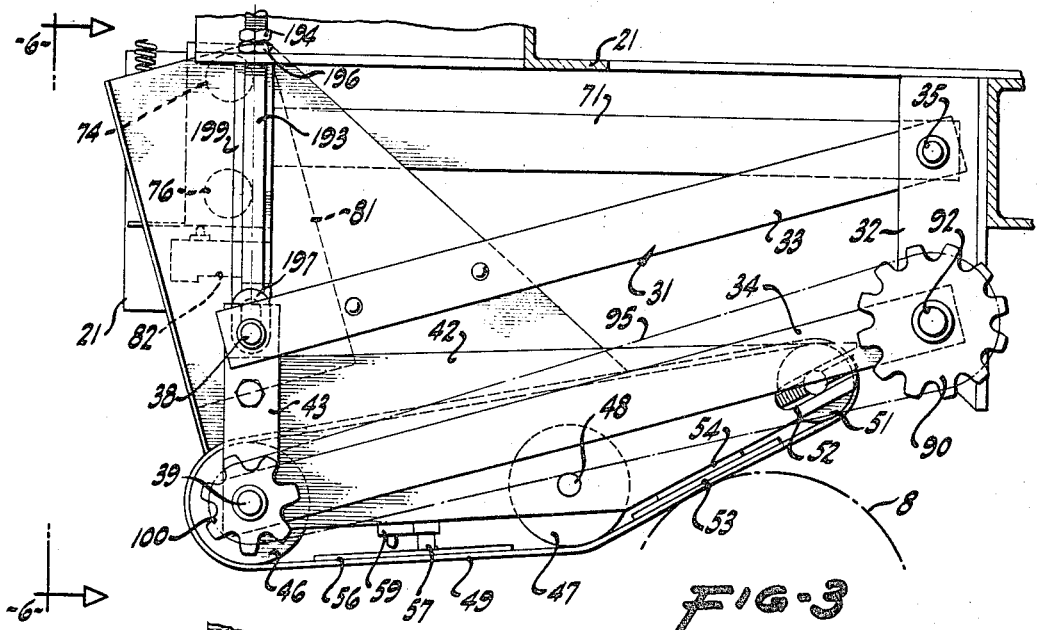
FIGURE 3 is a side elevation of a portion of the sensing mechanism drawn to an enlarged scale and with adjacent parts broken away, the plane of the view being indicated by the lines 3—3 of FIGURE 2.

As particularly disclosed in FIGURE 3, there is provided on the main frame 21 an adjustment or setting device for determining the height below which the sensing or detector frame cannot descend and thus establishing a minimum height below which lettuce heads are not sensed but are passed over. Extending through one of the flanges on the main frame 21 is a bolt 193 having a pair of adjusting nuts 194 and 196 at its upper end and carrying a loop 197 at its lower end surrounding the shaft 38. While the shaft has a reasonable freedom of vertical rising motion within the loop 197, the shaft 38 cannot lower beyond the bottom of the loop 197. The particular elevation, level or point at which the bottom of the loop is set can be changed by adjusting the nuts 194 and 196. The bottom of the belt 49 can be kept above any selected elevation so that lettuce heads which are too small to rise to that particular elevation are not actually contacted by the belt 49 but are passed over.

Figure 6:
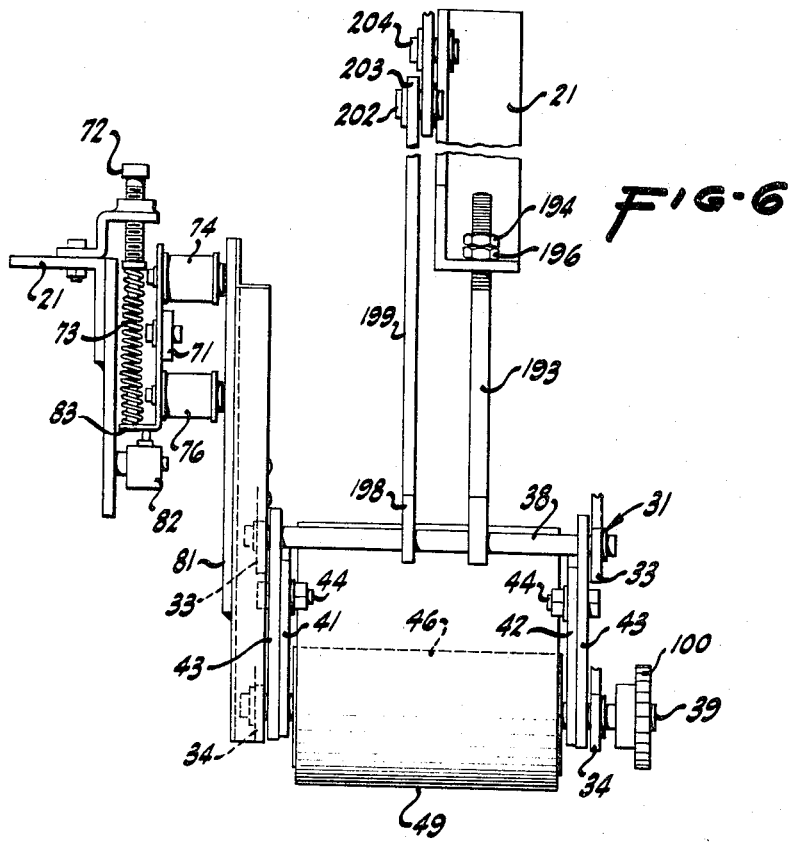
FIGURE 6 is an end elevation of a part of the selecting mechanism, the plane of the figure being indicated by the line 6—6 in FIGURE 3, and portions being broken away.

In a somewhat similar fashion, particularly as shown in FIGURE 6, as well as in FIGURES 1 and 2, the shaft 38 also lies within a loop 198 at the lower end of a strap 199 having a plurality of openings 201 therein. A pivot pin 202 fastens the strap to one end of a balance lever 203 connected by a fulcrum 204 to an upright 206 upstanding from the main frame 21. The lever 203 is extended on the other side of the fulcrum in the shape of a round rod 207 on which a weight 208 is movable to and fro. A set screw 209 holds the weight in any desired set position. The function of the weight 208 is to counterbalance not all but part of the weight of the detector frame and also part of the weight of the impulse frame when the two frames are temporarily secured together. The apertures 201 permit the balance beam to remain substantially horizontal when the detector frame is set at different heights for operation upon lettuce heads of corresponding heights.

In operation, the weight 208 is set at a forward or backward position on the balance rod in order that the downward force exerted through the belt 49 onto the top of the lettuce head may be adjusted. There is always a net downward force due to the weight of the detector frame, but this downward force is calculated so that overlying wrapper leaves are sufficiently depressed so that the belt 49 can be well supported on the subjacent lettuce head. The switch 59 is then actuated and the roller 46 moves from its trailing position on the up curve of the lettuce head and across the top of the lettuce. If the lettuce is not firm, then the roller travels substantially in a horizontal path since the combined weight of the detector and impulse frames cannot be overcome. If the lettuce is sufficiently firm, the roller 46 is cammed upwardly, the combined detector and impulse frames are lifted, and the storage mechanism and ultimately the severing instrumentality are actuated.

In accordance with this disclosure, therefore, I have provided a lettuce harvester which can be utilized in the lettuce field to select appropriate size lettuce heads and appropriately firm lettuce heads for cutting which will store a number of cutting impulses in the mechanism and will at an appropriate time in the advance of the machine actuate the severing mechanism to cut the lettuce heads and to deliver them for further processing.

What is claimed is:

1. A lettuce harvester comprising a frame adapted to be advanced over a lettuce head, means on said frame for contacting the top of said lettuce head and establishing the particular vertical height of said top of said lettuce head, a lettuce head cutter on said frame, and means on said frame responsive to vertical movement of said contacting means only above said particular height for operating said cutter to sever said lettuce head.

2. A lettuce harvested comprising a frame adapted to be advanced in a predetermined direction over a lettuce head, first means on said frame engaging the top of said lettuce head, second means on said frame and positioned by said first means for engaging a point on the trailing side of said lettuce head, and means on said frame responsive only to lifting of said second means above a predetermined amount by said lettuce head as said frame advances in said direction for severing said lettuce head.

3. A lettuce harvester comprising a frame adapted to be advanced in a predetermined direction over a lettuce head, means on said frame for engaging said lettuce head at a point on the trailing side thereof a predetermined distance below the top of said lettuce head, means on said frame and adapted to operate intermittently for severing a lettuce head, and means on said frame responsive to lifting of said engaging means by said lettuce head as said frame advances in said direction for operating said intermediate means for severing said lettuce head.

4. A lettuce harvester comprising a main frame adapted to be advanced in a predetermined direction over a lettuce head, a detector frame movably mounted on said main frame and adapted to depend onto said lettuce head, an impulse frame movably mounted on said main frame, means on said detector frame actuated by abutment with the top of said lettuce head for locking said detector frame and said impulse frame together, means on said detector frame engageable with a point on the trailing side of said lettuce head for lifting said locked detector frame and impulse frame by engagement with said lettuce head as said main frame advances, and means responsive to lifting of said detector frame for severing said lettuce head.

5. A lettuce harvester comprising a main frame adapted to be advanced in a predetermined direction over a lettuce head, a detector frame mounted on said main frame and having a portion positioned for abutment with the top of said lettuce head, means on said detector frame and disposed to abut a point on the trailing side of said lettuce head when said portion is in abutment with the top of said lettuce head and to be lifted by said lettuce head as said main frame advances, an impulse frame mounted on said main frame, means actuated when said portion is in abutment with the top of said lettuce head for locking said detector frame and said impulse frame together, and means responsive to lifting of said impulse frame for severing said lettuce head.

6. A lettuce harvester comprising a main frame adapted to be advanced in a predetermined direction over a lettuce head, a detector frame mounted on said main frame for lifting and lowering movement, means on said detector frame for simultaneously abutting said lettuce head at a high point and a low point, an impulse frame mounted on said main frame, means for simultaneously lifting said impulse frame and for lifting said detector frame relative to said main frame by movement of said low point abutting means to said high point as said main frame advances in said direction, and means on said main frame and responsive to said lifting movement of said impulse frame for severing said lettuce head.

7. A lettuce harvester comprising a main frame adapted to take a position over a lettuce head, means on said main frame for simultaneously abutting the upper portion of said lettuce head at a high point and at a low point spaced apart in a predetermined horizontal direction, means for moving said low point abutting means in said direction toward said high point while said low point abutting means bears upon said lettuce head, and means responsive to lifting movement of said low point abutting means as said low point abutting means moves toward said high point for severing said lettuce head.

8. A lettuce harvester comprising a main frame adapted to take a position over a head of lettuce, means on said main frame for bearing upon said lettuce head at a low point a predetermined distance below the top of said lettuce head, means for moving said bearing means from said low point toward said top while bearing upon said lettuce head, means effective only when energized for severing said lettuce head, and means effective only in response to lifting movement of said bearing means while moving toward said top for energizing said severing means.

9. A lettuce harvester comprising a main frame adapted to be advanced in a predetermined direction over a lettuce head, a detector frame, means for mounting said detector frame for lifting and lowering movement on said main frame, a pair of rollers, means for mounting said rollers to revolve about parallel horizontal axes on said detector frame, a responsive device, means for mounting said responsive device on said detector frame at a point between said rollers and higher than the bottom of at least one of said rollers, an impulse frame, means for mounting said impulse frame on said main frame for movement relative thereto, means controlled by said responsive device for locking said detector frame and said impulse frame together for movement in unison, and means responsive to movement of said impulse frame for severing said lettuce head.

10. A lettuce harvester as in claim 9 in which a belt is trained around said rollers and underlies said responsive device in a location between said lettuce head and said rollers and said responsive device.

11. A lettuce harvester as in claim 9 in which said means for locking includes a magnetically responsive member and a magnet disposed one on said detector frame and the other on said impulse frame.

12. A lettuce harvester as in claim 9 in which said means for locking includes a magnetically responsive plate on said detector frame and an electromagnet on said impulse frame, and said responsive device is an electric switch in circuit with said electromagnet.

13. A lettuce harvester comprising a main frame adapted to advance in a predetermined direction over and relative to a lettuce head, a detector frame, means for mounting said detector frame for lifting and lowering movement on said main frame, a contactor on said detector frame and adapted to lift said detector frame as said contactor passes over said lettuce head during said advance, an impulse frame, means for mounting said impulse frame for lifting and lowering movement on said main frame, means for electromagnetically coupling said impulse frame and said detector frame, means on said detector frame actuated by said lettuce head for controlling said coupling means, and means controlled by lifting of said impulse frame for severing said lettuce head.

14. A lettuce harvester as in claim 13 in which said severing means includes a knife spaced a predetermined distance behind said controlling means, and said severing means also includes a time delay mechanism effective to provide a delay in operation of said knife commensurate with said predetedmined distance.

15. A lettuce harvester as in claim 14 in which said time delay mechanism is plural to provide a series of delays each commensurate with said distance.

16. A lettuce harvester as in claim 13 in which said detector frame tends to lower and means are provided for exerting a selected lifting force on said detector frame.

17. A lettuce harvester as in claim 13 in which said detector frame tends to lower and means are provided for selectively limiting the lowering movement of said detector frame relative to said main frame.

18. A lettuce harvester as in claim 13 in which said severing means includes a knife movable in a horizontal path having a component normal to said predetermined direction.

19. A lettuce harvester as in claim 18 in which said severing means also includes means for urging a severed lettuce head to move transversely of said predetermined direction.

20. A lettuce harvester comprising a main frame, means for mounting said main frame at a predetermined elevation over a head of lettuce and for advancement over said head of lettuce in a predetermined direction, a detector frame, means for mounting said detector frame on said main frame for lifting and lowering movement about transverse horizontal axes, a pair of rollers, means for mounting said rollers on said detector frame for rotation about a pair of transverse horizontal axes, a belt trained around said rollers and adapted to be deflected upwardly therebetween by said head of lettuce when said detector frame bears downwardly thereon, means for regulating the force with which said detector frame bears downwardly on said lettuce head, a first electric switch on said detector frame adapted to be actuated by upward deflection of said belt, a magnetically responsive vertical plate on said detector frame, an impulse frame, means for mounting said impulse frame for lifting and lowering movement on said main frame, an electromagnet, means for mountnig said electromagnet on said impulse frame for coaction with said plate, means for energizing said electromagnet upon actuation of said first electric switch to lock said detector frame and said impulse frame together, a second electric switch, means responsive to lifting movement of said impulse frame for operating said second electric switch, a plurality of time delay mechanisms, a ground engaging wheel, means for mounting said ground engaging wheel for rotation on said main frame, means for driving said time delay mechanisms from said ground engaging wheel, means for actuating successive ones of said time delay mechanisms in response to successive operations of said second electric switch, a horizontal severing knife, means for mounting said knife on said main frame for planetary movement about a pair of vertical axes, means including a single cycle clutch for driving said knife, and means controlled by said time delay mechanisms for operating said clutch.

21. A lettuce harvester comprising a frame adapted to be positioned above a lettuce head, vertically movable means on said frame adapted to abut a rising portion of said lettuce head with a predetermined downward force, means for moving said frame relative to said lettuce head and dependent upon the firmness of said lettuce head for camming said abutting means upwardly against said downward force, and means for severing said lettuce head only in response to said upward movement of said abutting means.

22. A lettuce harvester comprising a frame adapted to be positioned above a lettuce head, means on said frame for sensing the presence beneath said frame of a lettuce head above a predetermined height, means controlled by said presence sensing means for sensing the firmness of said lettuce head, and means responsive only to firmness of said lettuce head above a predetermined minimum firmness for severing said lettuce head.

23. A lettuce harvester comprising a frame adapted to advance over a lettuce head, means on said frame operated only by a lettuce head above a predetermined firmness for severing a lettuce head, and means on said frame operated only by a lettuce head above a predetermined height for energizing said firmness operated means.

24. A lettuce harvester comprising a frame, means for moving said frame and a lettuce head relative to each other, means on said frame and operable in response to an impulse for severing said lettuce head, means on said frame and bearing against said lettuce head during said relative movement, yieldable means for urging said bearing means against said lettuce head, and means responsive only to yielding of said yieldable means in response to firmness of said lettuce head above a predetermined firmness for sending an impulse to said severing means and so operating said severing means for severing said lettuce head.

25. A lettuce harvester comprising means for sensing the size of a lettuce head, means for substantially simultaneously sensing the firmness of said lettuce head, and means responsive only to the operation of said size sensing means above a predetermined size and to the substantially simultaneous operation of said firmness sensing means above a predetermined firmness for severing said lettuce head.

26. A lettuce harvester as in claim 25 in which said size sensing means measures the height of said lettuce head above a datum plane and said firmness sensing means measures the change in deflection of the upper portion of said lettuce head under a predetermined change in load.

27. A lettuce harvester comprising a frame movable over a lettuce head growing in the ground, means on said frame for severing said lettuce head, and means on said frame for sensing the deflection of the upper portion of said lettuce head under a predetermined load, and means effective only when said deflection exceeds a predetermined amount for energizing said severing means.

28. A lettuce harvester comprising a frame movable over a lettuce head growing in the ground, a first roller on said frame adapted to roll over said lettuce head to the forward side thereof, a second roller on said frame adapted to abut said head of lettuce on the rearward side thereof, a switch on said frame and disposed between said rollers in a position to be operated by said lettuce head projecting upwardly between said rollers, means on said frame and operated by said switch to impose a predetermined downward load on said second roller, and means responsive to upward movement of said second roller against said load for severing said lettuce head.

29. A lettuce harvester comprising a frame adapted to be disposed adjacent a lettuce head growing in the ground, a knife on said frame, means on said frame for moving said knife into and out of position to sever said lettuce head, and means for controlling said knife moving means to move said knife into said position only when said lettuce head is above a predetermined height and above a predetermined firmness, said moving means including means for measuring the height of said lettuce head above a predetermined height above said ground and including means for measuring the firmness above a predetermined firmness of a selected portion of said lettuce head.

30. A lettuce harvester comprising a frame, means movably mounted on said frame adapted to be deflected against a predetermined force by passing in a curved path over a portion of said lettuce head while said frame is passing said letuce head in a rectilinear path, and means on said frame and responsive only to deflection of said movably mounted means above a predetermined minimum deflection for severing said lettuce head.

References Cited

UNITED STATES PATENTS

| | | | |
|---|---|---|---|
| 1,220,977 | 3/1917 | Goulet | 56—121.45 |
| 1,462,486 | 7/1923 | Devey | 56—121.45 |
| 1,578,283 | 3/1926 | Hammer | 56—121.45 |
| 2,337,307 | 12/1943 | Beck | 56—121.4 |
| 2,458,790 | 1/1949 | Messenger | 56—121.45 |
| 2,527,843 | 10/1950 | Orendorff | 56—121.45 |
| 2,654,205 | 10/1953 | Stadstad | 56—121.45 |
| 2,662,361 | 12/1953 | Botimer | 56—121.46 |

ANTONIO F. GUIDA, *Primary Examiner.*

RUSSELL L. KINSEY, *Examiner.*